United States Patent [19]

Nitta

[11] Patent Number: 5,649,056
[45] Date of Patent: Jul. 15, 1997

[54] SPEECH RECOGNITION SYSTEM AND METHOD WHICH PERMITS A SPEAKER'S UTTERANCE TO BE RECOGNIZED USING A HIDDEN MARKOV MODEL WITH SUBSEQUENT CALCULATION REDUCTION

[75] Inventor: Tsuneo Nitta, Yokohama, Japan

[73] Assignee: Kabushiki Kaisha Toshiba, Kawasaki, Japan

[21] Appl. No.: 195,845

[22] Filed: Feb. 14, 1994

Related U.S. Application Data

[63] Continuation of Ser. No. 854,032, Mar. 19, 1992, abandoned.

[30] Foreign Application Priority Data

Mar. 22, 1991  [JP]  Japan ................... 3-058797

[51] Int. Cl.$^6$ ............................................. G10L 5/00
[52] U.S. Cl. ................... 395/2.65; 395/2.28; 395/2.31
[58] Field of Search ............................... 395/2.28, 2.31, 395/2, 2.65, 2.48, 2.52; 381/43–51

[56] References Cited

U.S. PATENT DOCUMENTS

| | | | |
|---|---|---|---|
| 4,446,531 | 5/1984 | Tanaka | 364/728.05 |
| 4,736,429 | 4/1988 | Niyada et al. | |
| 4,888,823 | 12/1989 | Nitta et al. | |
| 5,027,406 | 6/1991 | Roberts et al. | 395/2 |
| 5,046,099 | 9/1991 | Nishimura | 395/2 |
| 5,131,043 | 7/1992 | Fujii et al. | 381/41 |
| 5,289,562 | 2/1994 | Mizuta et al. | 395/2 |

FOREIGN PATENT DOCUMENTS

| | | |
|---|---|---|
| 0265692A1 | 5/1988 | European Pat. Off. . |
| 0388067A2 | 9/1990 | European Pat. Off. . |

OTHER PUBLICATIONS

Rigoll, "Information Theory Principles for the Design of Self–Organizing Maps in Combination with Hidden Markov Modeling for Continuous Speech Recognition," International Joint Conference on Neural Networks, San Diego, CA, pp. 569–574 (Jun. 17–21, 1990).

Tseng et al., "Fuzzy Vector Quantization Applied to Hidden Markov Modeling," International Conference on Acoustics, Speech, and Signal Processing, Dallas, TX, pp. 641–644, vol. 2, (Apr. 6–9, 1987).

L.R. Rabiner, "A Turtorial on Hidden Markov Models and Selected Applications in Speech Recognition", published in Readings in Speech Recognition Edited by A. Waibel and Kai–Fu Lee, pp. 267–296 (1990).

*Primary Examiner*—Allen R. MacDonald
*Assistant Examiner*—Alphonso A. Collins
*Attorney, Agent, or Firm*—Finnegan, Henderson, Farabow, Garrett & Dunner, L.L.P.

[57] ABSTRACT

A sound analyzer sound analyzes an input speech signal to obtain feature vectors. A matrix quantizer performs a matrix quantization process between the feature vectors obtained by the sound analyzer and a phonetic segment dictionary prepared in phonetic segment units to obtain a phonetic segment similarity sequence. A PS-phoneme integrating section integrates the phonetic segment similarity sequence into a phonemic feature vector. A HMM recognizer checks the phonemic feature vector using a HMM prepared in certain units, to thereby perform a recognition process.

6 Claims, 4 Drawing Sheets

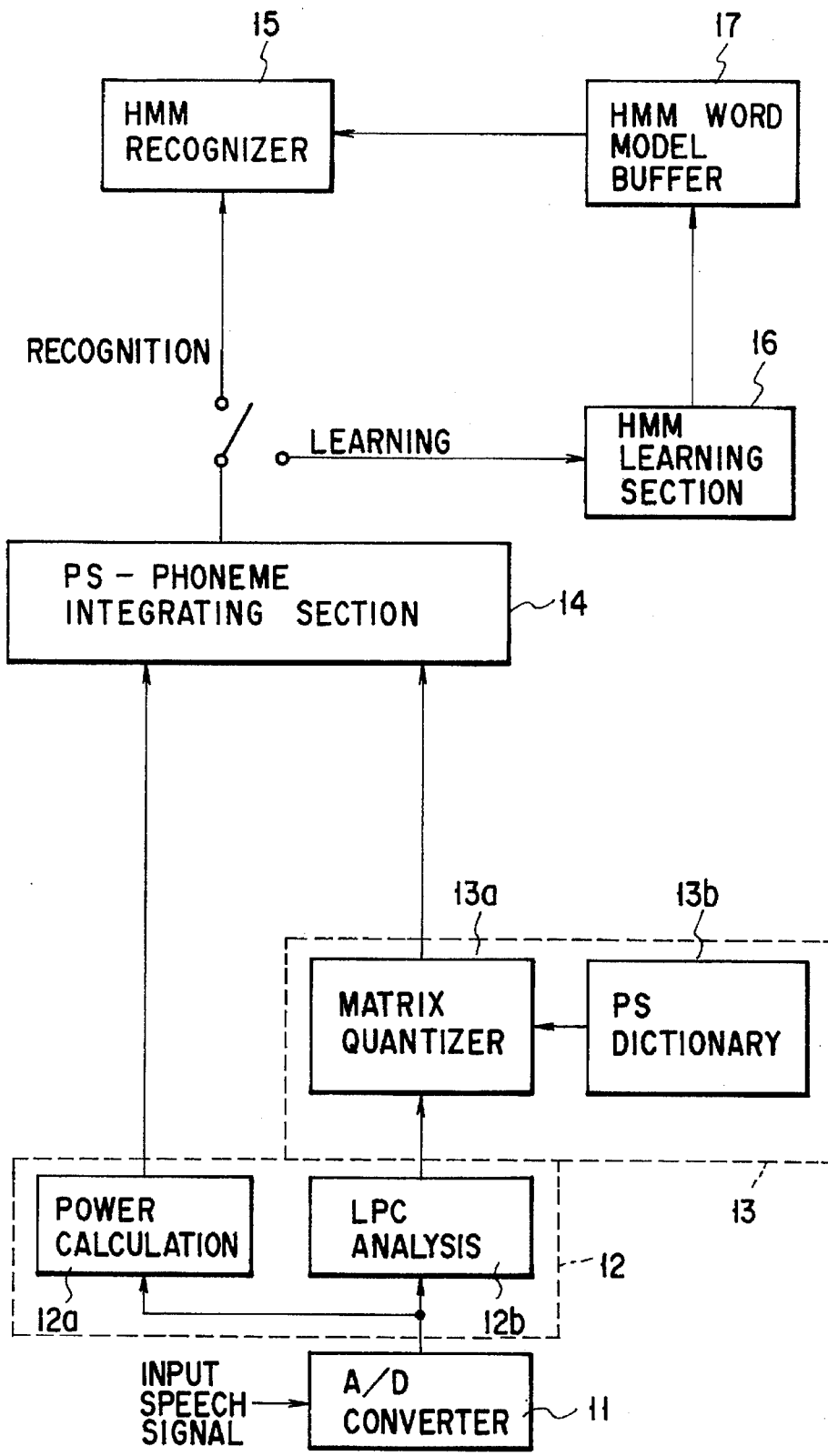
F I G. 1

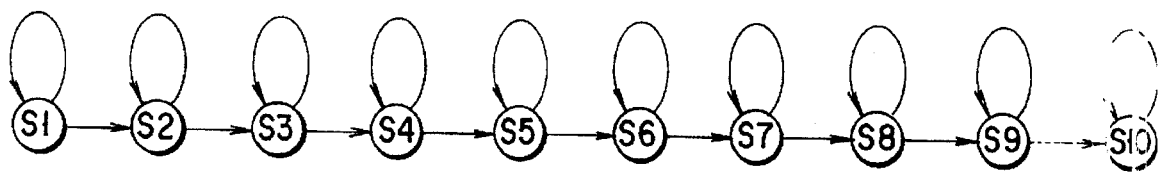
F I G. 2
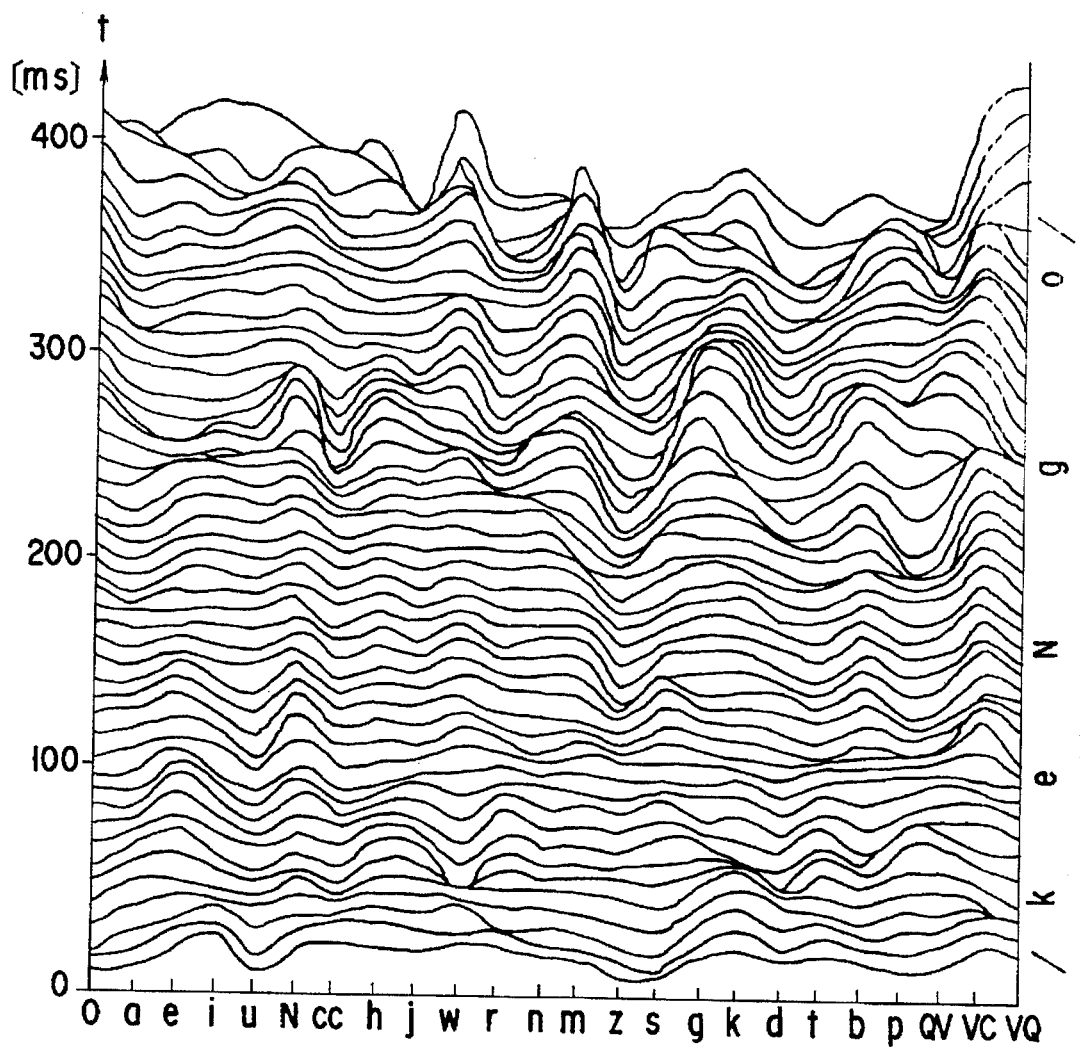
F I G. 3

SPEECH RECOGNITION SYSTEM AND METHOD WHICH PERMITS A SPEAKER'S UTTERANCE TO BE RECOGNIZED USING A HIDDEN MARKOV MODEL WITH SUBSEQUENT CALCULATION REDUCTION

This application is a continuation of application Ser. No. 07/854,032, filed Mar. 19, 1992, now abandoned.

BACKGROUND OF THE INVENTION

1. Field of the Invention

The present invention relates to a system for and methods of speech recognition which permit utterances to be recognized with high accuracy.

2. Description of the Related Art

Recently, a speech recognition system has achieved success which employs the HMM (hidden markov model) which transforms an utterance into a sequence of certain symbols (this transformation is referred to as vector quantization) and then models the utterance as the transition of the symbol sequence. A table that is referred to in transforming the utterance into symbols is called a phonetic segment (PS) table. The HMM is represented by a transition network having more than one state, in which, for each state, the probability of occurrence of each symbol and the interstate transition probability are embedded.

When the PS dictionary uses steady coefficients (for example, spectrum coefficients or cepstrum coefficients), speech events depend only on state information embedded in the HMM (there is no time relationship in one state). For this reason, differential information, such as Δ cepstrum, is introduced. That is, a method is adopted which replaces an utterance with a symbol sequence with not only its spectrum but also its time variations taken into account. However, with the PS dictionary having a large number of dimensions, distortion introduced by quantization will inevitably become very great. For this reason, use is made of two or more PS dictionaries having their numbers of dimensions decreased by dividing the parameter space (in the above example by separating the spectrum and the time variation information).

Besides those methods, there is a method which directly quantizes a sequence of spectra (or cepstrum), i.e., two-dimensional patterns, this method being called matrix quantization. The matrix quantization has, on the one hand, an advantage that speech patterns can directly be handled without approximation and, on the other hand, a drawback that quantization distortion increases. Thus, a method of decreasing the distortion by using a statistical technique at the time of quantization has been proposed.

However, even if those methods are used, distortion introduced by quantizing an utterance still remains great. Thus, a means of further decreasing the distortion is desired. In order to solve distortion problems, it is necessary only that a speech spectrum (or cepstrum) be directly expressed within the HMM without replacing it with symbols (i.e., without quantizing). Such a method is called "continuous HMM" as opposed to "discrete HMM" involving quantization. In general, the continuous HMM needs huge quantities of calculations. The reason is that a covariance matrix corresponding to each state must be obtained from an input vector sequence to the HMM, and then the products of the input vectors and the covariance matrices must be calculated at the time of speech recognition.

When an utterance is expressed by HMM, a phoneme, a syllable, a word, a clause, or a sentence will be considered as its unit. Whatever the unit, it is important that an input utterance and its model agree well with each other at the time of recognition, in other words, distortion be as low as possible. As described above, the best is the continuous HMM which directly enters into the HMM two-dimensional patterns that contain variations of the speech spectra with time. A problem with continuous HMM is that difficulties are involved in putting it to practical use because huge quantities of calculations are needed.

SUMMARY OF THE INVENTION

It is an object of the present invention to provide a speech recognition system and method which permit a speaker's utterance to be recognized with high accuracy, and to obviate the necessity of huge quantities of calculations.

According to a first aspect of the present invention, there is provided a speech recognition system comprising: sound analyzing means for sound analyzing an input speech signal to obtain feature parameters; a phonetic segment dictionary for storing a plurality of types of phonetic segments in advance; matrix quantization means for performing matrix quantization processing between said feature parameters obtained by said sound analyzing means and said phonetic segment dictionary to obtain a phonetic segment similarity sequence; integrating means for integrating said phonetic segment similarity sequence obtained by said matrix quantization means into a phonemic feature vector; and means for checking said phonemic feature vector obtained by said integrating means using a hidden markov model (HMM) prepared in certain units, thereby performing a recognition process.

According to a second aspect of the present invention, there is provided a speech recognition system comprising: sound analyzing means for sound analyzing an input speech signal to obtain feature parameters; a phonetic segment dictionary for storing a plurality of types of phonetic segments in advance; vector quantization means for performing vector quantization processing between said feature parameters obtained by said sound analyzing means and said phonetic segment dictionary to obtain a phonetic segment similarity sequence; integrating means for integrating said phonetic segment similarity sequence obtained by said vector quantization means into a phonemic feature vector; and means for checking said phonemic feature vector obtained by said integrating means using a hidden markov model (HMM) prepared in certain units, thereby performing a recognition process.

According to a third aspect of the present invention, there is provided a speech recognition system comprising: sound analyzing means for sound analyzing an input speech signal to obtain feature parameters; a phonetic segment dictionary for storing a plurality of types of phonetic segments in advance; a neural network 10 for obtaining a phonetic segment similarity sequence from said feature parameters obtained by said sound analyzing means; integrating means for integrating said phonetic segment similarity sequence obtained by said neural network into a phonemic feature vector; and means for checking said phonemic feature vector obtained by said integrating means using a hidden markov model (HMM) prepared in certain units, thereby performing a recognition process.

According to a fourth aspect of the present invention, there is provided a speech recognition method comprising the steps of: a) sound analyzing an input speech signal to obtain feature parameters; b) performing matrix quantization processing between said feature parameters obtained by the step a) and a phonetic segment dictionary storing a plurality of types of phonetic segments in advance to obtain a phonetic segment similarity sequence; c) integrating said phonetic segment similarity sequence into a phonemic feature vector; and d) checking said phonemic feature vector obtained by the integrating step c) using a hidden markov model (HMM) prepared in certain units, thereby performing a recognition process.

According to a fifth aspect of the present invention, there is provided a speech recognition method comprising the steps of: a) sound analyzing an input speech signal to obtain feature parameters; b) performing vector quantization processing between said feature parameters obtained by the step a) and a phonetic segment dictionary storing a plurality of types of phonetic segments in advance to obtain a phonetic segment similarity sequence; c) integrating said phonetic segment similarity sequence into a phonemic feature vector; and d) checking said phonemic feature vector obtained by the integrating step c) using a hidden markov model (HMM) prepared in certain units, thereby performing a recognition process.

According to a sixth aspect of the present invention, there is provided a speech recognition method comprising the steps of: a) sound analyzing an input speech signal to obtain feature parameters; b) passing said feature parameters obtained by the step a) through a neural network to obtain a phonetic segment similarity sequence; c) passing said phonetic segment similarity sequence obtained by the step b) through maximum-value filters to thereby integrate said sequence into a phonemic feature vector; and d) checking said phonemic feature vector obtained by the integrating step c) using a hidden markov model (HMM) prepared in certain units, thereby performing a recognition process.

According to a seventh aspect of the present invention, there is provided a speech recognition method comprising the steps of: a) sound analyzing an input speech signal to obtain feature parameters; b) passing said feature parameters obtained by the step a) through a neural network to obtain a phonetic segment similarity sequence; c) passing said phonetic segment similarity sequence obtained by the step b) through neural networks to thereby integrate said sequence into a phonemic feature vector; and d) checking said phonemic feature vector obtained by the integrating step c) using a hidden markov model (HMM) prepared in certain units, thereby performing a recognition process.

The present invention sound-analyzes an input speech signal to obtain feature parameters, performs matrix quantization processing between the feature parameters and a phonetic segment dictionary of predetermined phonetic segment units to obtain a phonetic segment similarity sequence, integrates the phonetic segment similarity sequence into a phonemic feature vector, and checks the phonemic feature vector obtained by the integration using a hidden markov model (HMM) prepared in certain units, thereby performing a high-accuracy recognition process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram of a speech recognition device to which a speech recognition system of the present invention is applied;

FIG. 2 illustrates a typical example of an HMM structure;

FIG. 3 illustrates one example of a phonemic feature vector corresponding to a word part;

DETAILED DESCRIPTION OF THE PREFERRED EMBODIMENTS

Figure 4:
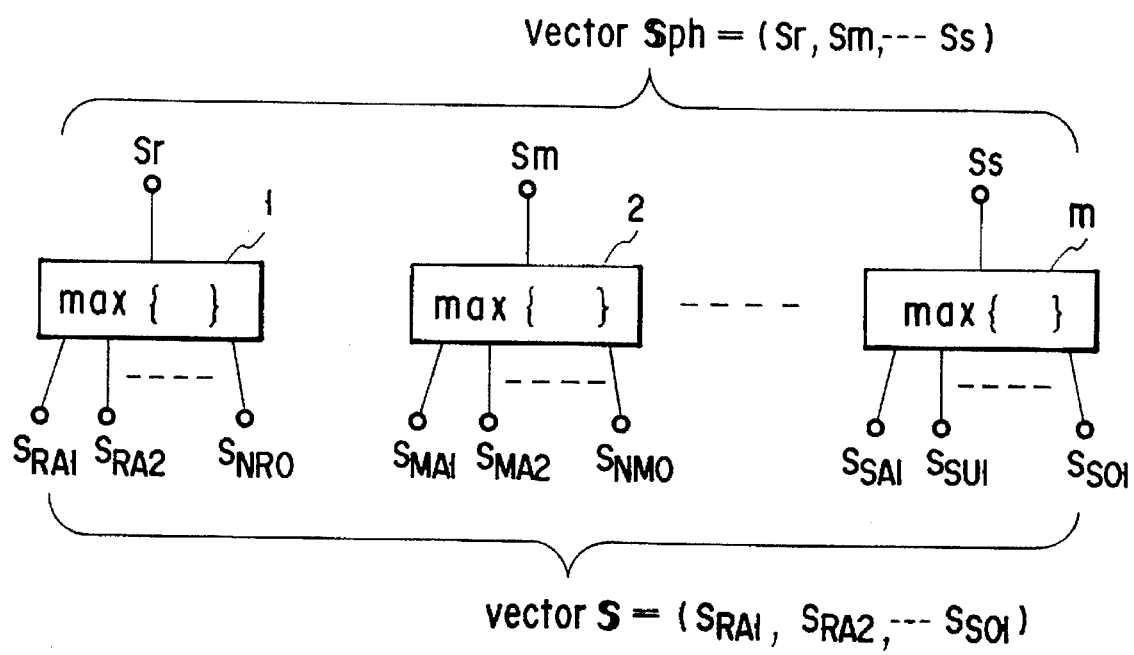
FIG. 4 is a block diagram of the PS-phoneme integrating section of FIG. 1 constructed from maximum-value filters.

With reference to the drawings, the preferred embodiment of the present invention will be described in detail as follows.

In the present invention, a phonetic segment (hereinafter abbreviated to PS), which is phonetically significant is used as a unit of quantization, and after a sequence of PS similarities (distances) is integrated into a phoneme, a phonemic feature vector sequence is fed to an HMM word matching section.

In FIG. 1, a continuous input speech signal is fed to an analog-to-digital (A/D) converter 11 and is quantized at a sampling frequency of, for example, 12 KHz to obtain a digital signal of 12 bits. The digital speech signals from A/D converter 11 are fed to a power calculation section 12a and mel-cepstrum analysis section 12b employing linear predictive coding (LPC) in digital signal processor 12. Power calculation section 12a calculates the power of input speech with each frame cycle, i.e., every 8 msec, and outputs the results of calculation to a PS-phoneme integrating and converting section 14.

LPC analysis section 12b is an analysis section that employs LPC mel-cepstrum of 16 levels as analysis parameters at, for example, 16 msec for window length and 8 msec for frame cycle.

The symbol sequence for each frame thus obtained with the assignment of eight levels to 16 channels are transmitted as feature parameters for the input speech to matrix quantizer 13a of digital signal processor 13. PS is an achronym for a phonetic segment and indicates unit for speech recognition with a phonetix means in the following.

Phonetic segments, employed for speech inputs in expressions of four arithmetic operations, are classified into the following seventy-nine types.

(1) In matrix quantizer 12 the continuous matching process of PS is performed using similarity measures based on a subspace method represented by $$C(PS) = \sum_{m=1}^{M} (C \cdot \phi m)^2 / \|C\|^2$$

where C denotes the LPC mel-cepstrum (C={C1, C2, ..., CN}), $\phi$ denotes the eigenvector of PS, (.) denotes the inner product, and ‖‖ denotes the norm. That is, PS dictionary 13b is expressed by M orthogonal eigenvectors of each PS.

Here, the PS used in the present invention will be described. For example, the PS comprises:

(1) A continuant segment;
  (1-1) a steady part of a vowel,
  (1-2) a continuant consonant.
(2) A consonant segment; a demisyllable including a transient part to a vowel.
(3) A boundary segment;
  (3-1) a boundary part between a vowel and a semi-vowel,
  (3-2) a boundary part between a vowel and a consonant, and
  (3-3) a boundary part between a vowel and a silent part.
(4) Other phonetic segments, devoiced vowels, VCV (V: vowel, C: consonant), etc.

As an example, 191 types of phonetic segments selected for a set of utterances of 100 words are indicated below.

Continuant segments:
  AA1A, AA2A, II1A, II2A, II3A, UU1A, UU2A, UU3A, EE1A, EE2A, OO1A, OO2A, NN1A, NN2A, NN4A, NN5A, BZ1A, MM1A, RR1A, BB1A, SS1C, SHLC, CC1C, ZZ1A, HHAB, HHIB, HHEB, HHOB, HVAA, HVIA, HVUA, HVEA Consonant segments:
  QA1D, KALE, KA2C, SA2E, TA2C, NA2B, HA2B, GA2C, DA1E, DA2B, CA1E, FA1C, FA2C, KI1E, KI2C, SI2E, NI1C, NI2B, HI1D, HI2C, MI2B, RI2B, BI1C, BI2B, PI1C, PI2C, KU1E, KU2C, SU2D, CU1E, CU2E, HU1D,
  RU2B, ZU2D, BU2B, QE1D, KE1E, KE2C, SE1E, SE2E, TE1D, TE2C, NE1C, NE2B, HE1D, HE2B, ME1C, ME2B, RE1C, RE2B, GE1D, GE2E, ZE1E, ZE2E, DE1C, DE2B, BE1C, BE2B, PE1C, PE2B, QO1D, KO1D, KO2C, TO1D, TO2C, NO2B, HO1D, FO1E, FO2E, MO2B, GO2C, DO2B, BO2B, PO1C, PO2B, KY1E, SY1E, CY1E, NY2D, HY2E, RY1D, RY2D, ZY2D Boundary segments:
  Boundary parts between vowels and semi-vowels
  AI1E, ANNC, INNC, IF1C, IA1E, UA1C, EI1C, EO1E, ENNC, EU1C, OI1E, OU1C, ONNC, NNOC, NNEB
  Boundary parts between vowels and consonants
  YA1E, YU1E, YO1E, AS1A, AN1A, AM1A, AR1A, AZ1A, AO1A, AB1A, IS1A, IN1A, IH1A, IR1A, IG1A, IO1A, IB1A, US1A, UN1A, UM1A, UD1A, UB1A, EN1A, EH1A, EF1A, EM1A, ER1A, EG1A, ON1A, OH1A, OM1A, OR1A, OG1A, OD1A, OB1A, NS1A, NH1A, NG1A, NZ1A
  Boundaries between vowels and silent parts
  AQ1A, IQ1A, UQ1A, EQ1A, OQ1A, NQ1A Other segments:
  VCV
  ANAC, ANEC, AREC, IRIC, IBOC, UNEC, UDAC, UBUC, EREC, ERUC, ORIC, ORUC
  Devoiced vowels and others
  KSID, KQID, AUQA AA1, AA2 in the continuant segments indicate that the latter has been cut out from a vowel [a] with a light stress. II3, UU3 are unvoiced segments. NN1 through N5 correspond to different phonemic environments. BZ1 through ZZ1 correspond to vocal cord sounds and other phenomena. HHA through HHO correspond to unvoiced [h], and HVA through HVE correspond to voiced [h].

Next, QA1 in the consonant segments indicates a vowel at the onset of a word, and KA1, KA2 indicates that the latter has, in principle, been cut out from within a word. For example, [tʃa], which is one of contracted sounds, is comprised of a boundary segment interposed as CA1→YA1→AA1 (with actual speech, the transition can occur from CA1 to AA1 or AA2).

As boundary segments, the boundary parts between vowels and semi-vowels (AII), the boundary parts between vowels and consonants (AS1), and the boundary parts between vowels and silent parts (AQ1) are entered. Note that, in the segments representing the boundary parts between vowels and semi-vowels, the syllabic nasal is denoted by NN (ANN).

The other segments include VCV segments (ANA) in which consonants are about to be devoiced, and segments in which vowels are about to be devoiced, which are observed when the speed of utterance is high. Stored in PS dictionary 13b is such information on the 191 types of speech segments as an orthogonalization dictionary.

The operation of the sound analyzer and the matrix quantizer is described in detail in the specification of U.S. Pat. No. 4,888,823 assigned to the same assignee as this application.

When such PS is used as a segment at the time of quantization, the number of dimensions of feature parameters of a segment (herein the orders of LPC mel-cepstrum) and the time width (the number of frames) are problems. That is, for the steady part of a vowel, it is required that the number of dimensions of its feature parameters be large, but the number of its frames may be small. Moreover, a plosive consonant must to some extent be large in the number of dimensions of its feature parameters and in the number of its frames. Furthermore, a fricative consonant may be small in the number of dimensions of its feature parameters but needs a large number of frames. Thus, in the present invention, the feature parameters and the number of frames of each PS are set as follows:

(feature parameters, the number of frames);
  A=(16, 4)
  B=(4, 6)
  C=(12, 8)
  D=(10, 10)
  E=(8, 12)

A selection is made from among these combinations. Of the four PS-type indicating characters described above, the last character indicates this setting. As a result, a vowel such as AA1A can be set so that the number of dimensions of its feature parameters is as large as 16, and a fricative consonant such as ZE1E can be set so that the number of its frames is as large as 12. Thereby, the total number of dimensions of the entire PS is brought within a relatively narrow range of 64 to 100. This enables a statistical matching process (for example, a subspace method) to reduce quantization distortion.

To see the accuracy of a PS similarity sequence obtained by matrix quantizer 13a, an evaluation experiment was made on a spoken word by obtaining a PS sequence of the first rank and inputting its symbol sequence to the discrete HMM. The experiment was performed on word utterances of unspecified speakers. As a result of this experiment, a recognition rate of 98.4% was obtained for 32 words, which is substantially the same as that by a conventional pattern matching method performed on a word-by-word basis. However, for 32 words comprised of pairs of similar words, only a 91.0% recognition rate was obtained. The experiment has shown that, with the discrete HMM employing a symbol sequence of the first rank, the quantization error still remains great, and the HMM needs to be treated as a continuous distribution.

However, the direct application of the continuous distribution HMM to a vector S=(S1, S2, ..., Sn) composed of n kinds of PS similarities is inexpedient because huge quantities of calculations are required. Thus, a method which applies the continuous distribution HMM was adopted after a similarity space Rn of phonetic segments has efficiently been integrated into a phonemic feature space Rm (m<<n).

Many of phonetic segments PS are designed to represent phonemes under various environments appearing in an utterance as described above. For this reason, a correspondence between phonetic segments and phonemes is relatively easy to establish. For example, phonetic segments corresponding to the \r\ phoneme includes the following 44 types:

RA1, RA2, RI1, RI2, RU1, RU2, RE1, RE2, RO1, RO2, RY1, RY2, RW1, RW2, ARA, ARI, ARU, ARE, ARO, IRA, IRI, IRU, IRE, IRO, URA, URI, URU, URE, URO, ERA, ERI, ERU, ERE, ERO, ORA, ORI, ORU, ORE, ORO, NRA, NRI, NRU, NRE, NRO

Here, of numerals attached to the segment names, "1" indicates that the segment is at the head of a word, and "2" indicates that the segment is within a word. Like ARA, the segments that are sandwiched by vowels are of the VCV type.

There are various methods of integrating phonetic segments into a phoneme. A general form is represented by equation (1)

$$S\ phoneme = f\{S\ PS(i)\} \quad (1)$$

where f { } indicates a function for integrating similarity values S ps(i) (or distance values) of similarity values S ps(i) of phonetic segments PS(i) that belong to a phoneme (for example, \r\). An example of function f { }, is the following maximum-value filter.

$$f = \max\ \{S\ ps(i)\} \quad (2)$$

Equation (2) indicates the maximum value of the similarity values S ps(i) of phonetic segments belonging to a phoneme (for example, \f\) is taken as the score S phoneme of the phoneme. FIG. 4 illustrates the case where maximum-value filters are provided in parallel to integrate a PS similarity vector S into a phonetic score vector $S_{ph}$ with a small number of dimensions.

Figure 5:
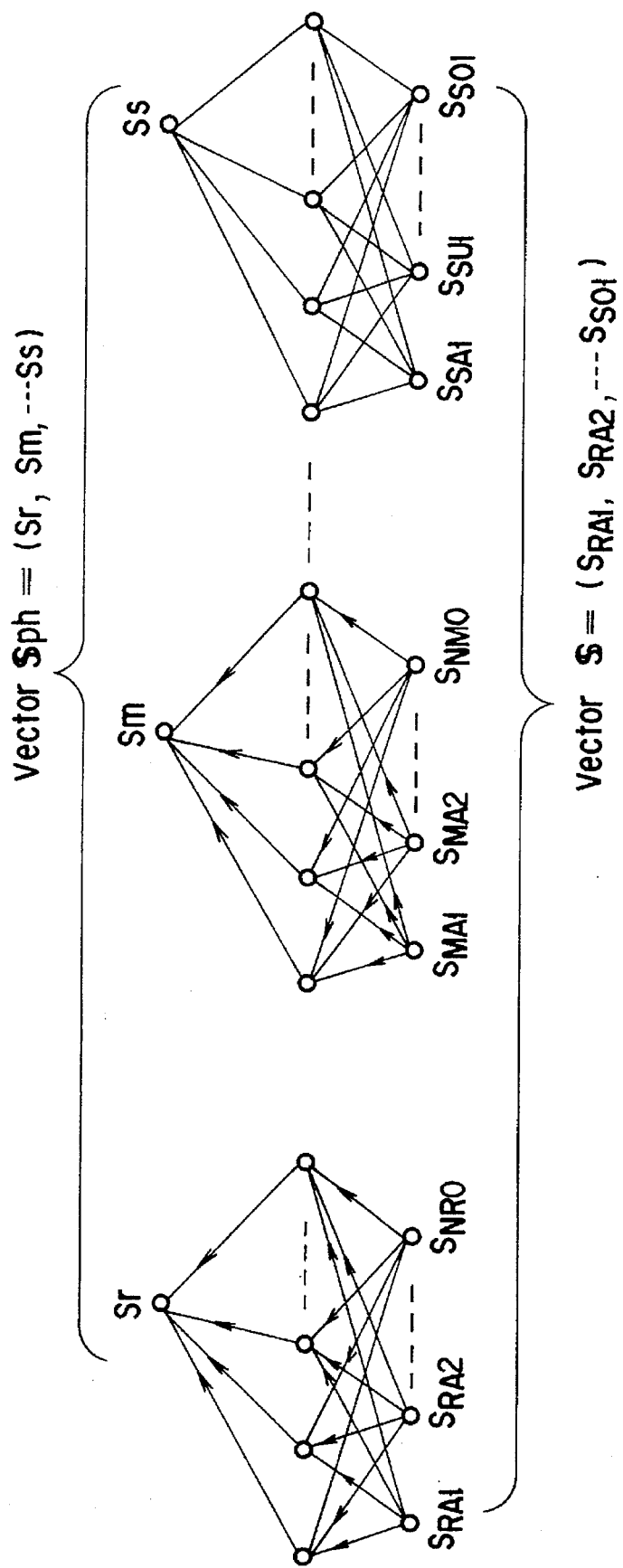
FIG. 5 is a diagram illustrating the PS-phoneme integrating section of FIG. 1 constructed from neural networks.

Next, FIG. 5 illustrates an example of integration using neural networks. In FIG. 5, a three-layer neural net is provided for every m phonemes, and similarity values Sps (i) of a phonetic segment PS(i) are passed through the neural network for each phoneme, whereby they are integrated as the phonetic score S phoneme. The arrows in FIG. 5 indicate weighting coefficients of the neural nets. The weighting coefficients can be obtained by a well-known back propagation algorithm using learning data. The provision of independent neural networks in parallel permits PS similarity vectors S to be integrated into phonemic score vectors $S_{ph}$ with a small number of dimensions.

Generally used phonemes include 19 types of phonemes of {o, a, e, i, u, h, j, w, r, n, m, z, s, g, k, d, t, b, p}. In the present embodiment, in addition to the 19 types of phonemes, a Japanese independent nasal sound |N|, a vowel at onset of a word, a continuant consonant C, a transient part from a vowel to a consonant, and a transient part X from a vowel to a silent part are used as phonemic features. That is, the present embodiment uses 24 types of phonemic features. Thereby, the PS similarity sequence is transformed into a sequence of 24-dimensional phonemic feature vectors by PS-phoneme integrating section 14 which carries out the process indicated by equation (1) and then sent to a HMM recognizer 15. FIG. 3 illustrates an example of a phonemic feature vector corresponding to a word utterance "KENGO" (robust).

Next, the word matching of the present invention using HMM will be described. It is supposed that the HMM has N states, S1, S2, ..., Sn, and the initial state is distributed to the N states in a statistical manner. In speech, a model is used which makes a state transtion with with a certain probability (transition probability) with each frame cycle. At the occurrence of a transition, a label is output with a certain probability (output probability). However, a null transition that outputs no label might be introduced. Even if an output label sequence is given, a state transition sequence is not determined uniquely because there are a number of ways in which the state transition is made. Since it is only a label sequence that can be observed, the model is called the hidden markov model. The HMM model M is defined by the following six parameters.

N: the number of states (the states S1, S2, ..., SN, N=10 in experiment)

K: the number of states (label L=1, 2, ..., K, K=191 in experiment)

pij: the transition probability (the probability of transition from Si to Sj)

qij(k): the probability of outputting of the label k at the transition from Si to Sj mi: the initial state probability (in the experiment, the initial state is restricted to S1)

F: the set of final states (in the experiment, the final state is restricted to S10)

Next, transition restrictions reflecting speech features are made on the model. In speech recognition, a loop which returns from a state Si to a previous state (Si-1, Si-2, ...) is generally not allowed sincen the time sequence is disturbed. FIG. 2 illustrates a typical example of the HMM structure described above.

The learning of the HMM needs to apply a label sequence O to HMM learning section 16 and to estimate the parameters of model M in which Pr (O/M) is maximum. As an algorithm used for the estimation, the forward-backward algorithm is known.

The evaluation (recognition) of the HMM obtains the probability Pr(O/M) that the model M will output the label sequence O=O1, O2, ..., OT. That is, HMM recognizer 15 assumes models for each word and retrieves such a model (word) as Pr(O/M) is maximum using the Viterbi algorithm.

The above description depends mainly on the discrete HMM. With the continuous output probability distribution HMM (hereinafter referred to as the continuous HMM), the input is not a label sequence but a vector (in the present invention, a phonemic feature vector). This permits the provision of the vector occurrence distribution in place of the above output probability qij(k) (the probability of outputting of the label k at the time the transition is made from Si to Sj). Usually, the distribution (the distribution of the elements of a vector) is treated as a normal distribution or a mixture of normal distributions. The continuous HMM model is defined by the six following parameters.

N: the number of states (state S1, S2, ..., SN; in the experiment N=10)

pij: the transition probability (the probability of transition from Si to Sj)

$\mu$ij: the mean vector occurring at the time of the transition from Si to Sj $\Sigma$ij: the covariance of a vector occurring at the time of the transition from Si to Sj mi: the initial state probability (in the experiment, the initial state is restricted to S1)

F: the set of final states (in the experiment, the final state is restricted to S10)

In the mixed distribution, more than one mean vector and more than one vector covariance are given. The learning and evaluation (recognition) of the continuous HMM are performed by using the forward-backward algorithm and the Viterbi algorithm, respectively, as in the discrete HMM.

In the experiment, many pieces of learning data (phonemic feature vectors) were applied to HMM learning section 16, and the parameters of each model M corresponding to 32 words were estimated so as to maximize the probability Pt(O/M) (with the continuous HMM, O is a vector sequence). The model parameters (µij and Σij for each word) thus obtained are stored in HMM word model buffer 17.

Next, at the stage of recognition, HMM recognizer 15, for each model stored in HMM word model buffer 17, obtains the probability Pt(O/M) of phonemic feature vector for input speech and finds such a model as the probability is maximum. The word corresponding to the model is the result of the recognition. The evaluation experiment of the present invention was conducted on the same data (32 similar words) as in the above-mentioned experiment using the discrete HMM. The experiment was made for the case using a single normal distribution as the vector occurrence distribution and for the case using two normal distributions (mixed distribution). However, the covariance uses only diagonal elements because of an insufficient amount of learning data. The results were 91.3% in the case of the single distribution and 92.4% in the case of the mixed distribution, which exceed the result (91.0%) of the experiment using the discrete HMM. The experiment has shown that the present invention is excellent.

According to the embodiment, as described above, with a phonetically significant phonemic segment (PS) used as a unit, a statistical matrix quantization process is performed, and a recognition process is carried out using HMM after a PS similarity sequence has been integrated into a phonemic feature vector, permitting various distortions occurring in continuous speech to be absorbed effectively, thereby realizing high-accuracy speech recognition. In addition, the embodiment has a great advantage in that there is no need for huge quantities of calculations.

Although, in the above embodiment, matrix quantization processing is performed on feature vectors obtained by sound analysis, usual vector quantization may be used instead. Moreover, there would be possible such a modification as to pass feature parameters through a recognizer such as a neural network set in units of a phonemic segment, to integrate the output of the recognizer into a phonemic feature vector, and then to pass the phonemic feature vector through continuous output probability distribution HMM. Furthermore, although, in the above embodiment, maximum-value filters are used for integration into a phonemic feature vector, entry of a phonemic segment similarity sequence into a neutral network for integration into a phonemic feature vector would also be possible.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A speech recognition system comprising:

sound analyzing means for sound analyzing an input speech signal to obtain a plurality of two-dimensional feature parameters;

a phonetic segment dictionary for storing a plurality of types of phonetic segments including continuant segments, consonant segments, and boundary segments;

means, coupled to the sound analyzing means and the phonetic segment dictionary, for matrix-quantizing the plurality of two-dimensional features parameters obtained by the sound analyzing means using the plurality of types of phonetic segments stored in the phonetic segment dictionary to obtain a phonetic segment similarity vector sequence;

means for generating a phonemic feature vector sequence, wherein the phonemic feature vector sequence is comprised of elements, wherein each element represents similarity of the input to a stored phonetic segment;

verifying means, coupled to the generating means, for verifying the phonemic feature vector sequence obtained by the generating means by comparing the phonemic feature vector sequence with a previously stored continuous hidden markov model (HHM); and means for recognizing speech based on a result of verifying the phonemic feature vector sequence.

2. The system according to claim 1, wherein the generating means comprises a plurality of maximum-value filters for generating the phonetic segment similarity vector sequence.

3. The system according to claim 1, wherein the generating means comprises a plurality of neural networks for generating the phonetic segment similarity vector sequence.

4. A speech recognition method comprising the computser steps of:

sound analyzing an input speech signal to obtain a plurality of two-dimensional feature parameters;

matrix-quantizing the feature parameters obtained by the sound analyzing step using a phonetic segment dictionary storing a plurality of types of phonetic segments including continuant segments, consonant segments and boundary segments, to obtain a phonetic segment similarity vector sequence;

generating a phonemic feature vector sequence from the phonetic segment similarity vector sequence;

verifying the phonemic feature vector obtained by the generating step by comparing the phonemic feature vector sequence with a previously stored continuous hidden markov model (HMM); and recognizing speech based on a result of verifying the phonemic feature vector sequence.

5. The system according to claim 1, wherein the means for matrix-quantizing comprises a matrix-quantizer for obtaining the phonetic segment similarity vector sequence by matrix-quantizing the plurality of two-dimensional feature parameters.

6. The system according to claim 1, wherein the means for matrix-quantizing comprises a neural network for obtaining the phonetic segment similarity vector sequence by matrix-quantizing the plurality of two-dimensional feature parameters.

* * * * *

UNITED STATES PATENT AND TRADEMARK OFFICE
CERTIFICATE OF CORRECTION

PATENT NO. : 5,649,056
DATED : July 15, 1997
INVENTOR(S) : Tsuneo Nitta

It is certified that error appears in the above-indentified patent and that said Letters Patent is hereby corrected as shown below:

Claim 1, column 10, line 13, "features" should read --feature--.

Claim 4, column 10, line 37, "computser" should read --computer--.

Signed and Sealed this

Thirteenth Day of January, 1998

Attest:

Attesting Officer

BRUCE LEHMAN

Commissioner of Patents and Trademarks